Oct. 31, 1950     F. WETZEL, SR     2,528,404
BASKET

Filed Oct. 9, 1947     2 Sheets-Sheet 1

*INVENTOR.*
FRED WETZEL SR.
BY Wilfred Lawson
ATTORNEY

Oct. 31, 1950   F. WETZEL, SR   2,528,404
BASKET
Filed Oct. 9, 1947   2 Sheets-Sheet 2
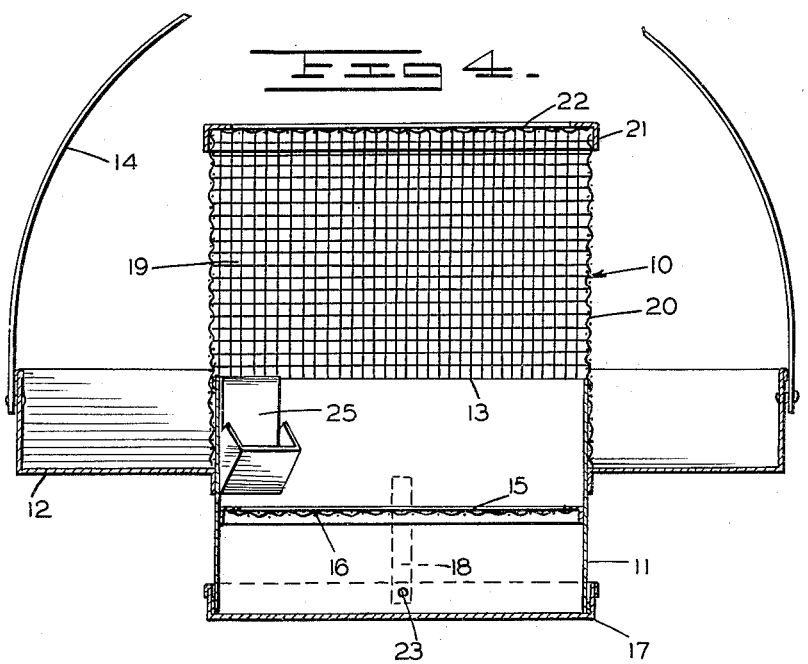
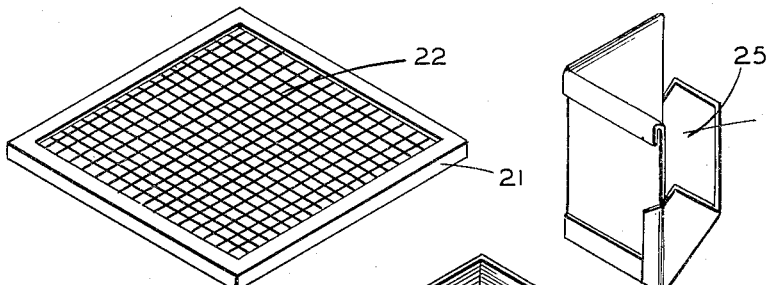
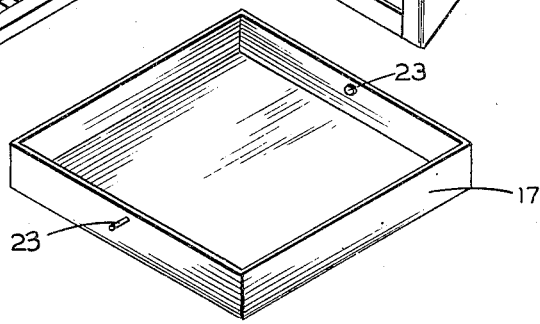
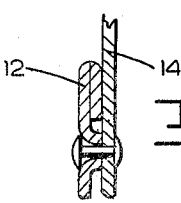
*INVENTOR.*
FRED WETZEL SR.
BY Wilfred E. Lawson
ATTORNEY Patented Oct. 31, 1950

2,528,404

UNITED STATES PATENT OFFICE 2,528,404

BASKET

Fred Wetzel, Sr., Pleasantville, N. J.

Application October 9, 1947, Serial No. 778,916

3 Claims. (Cl. 224—48)

My invention relates to a ventilated basket suitable for transportation of live animals, without discomfort to them. The basket can also be used for carrying other articles such as fresh flowers and vegetables for picnics or outings. In its simplest form the basket may be made square or round, but other shapes may also be used and in any desirable size.

A central compartment is in the form of a cage having its floor, top and upper sides removable for cleaning, and a surrounding tray for holding feed or water, in the case of animals, or candy, fruit or flowers, for human use. A handle is hinged on said tray and is arched over the top for convenient carrying of the basket.

These and other objects and advantages will be understood from the subjoined description with the aid of the attached drawings:

Figure 4 is a vertical sectional view taken through the device with the handle in fragment;

Figure 5 is a view in perspective of the lid per se.

Figure 6 is a view in perspective of the removable bottom per se;

Figure 7 is a fragmentary sectional view illustrating the pivot connection at one end of the handle, and Figure 8 is a view in perspective of one of the cups per se.

Figure 1:
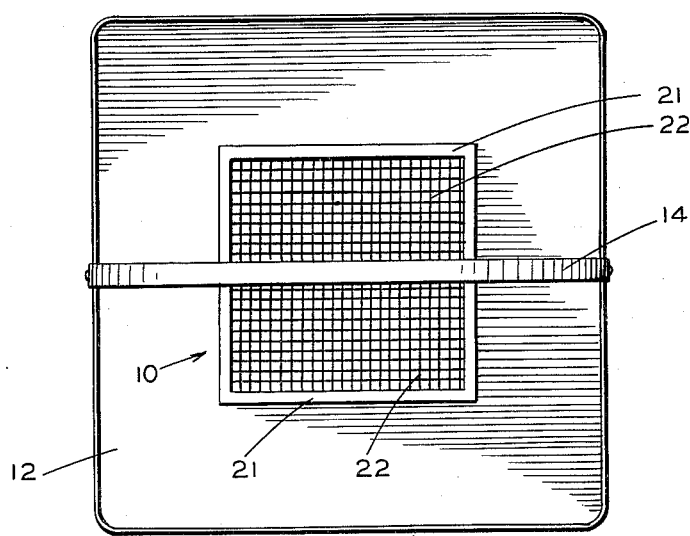
Figure 1 is a view in top plan of a basket constructed in accordance with the invention.
Figure 2:
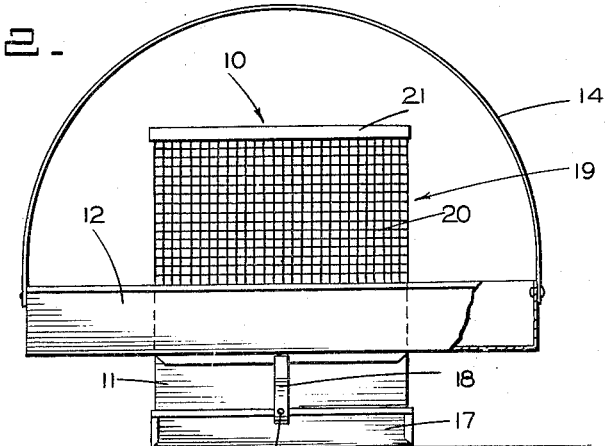
Figure 2 is a view in side elevation.
Figure 3:
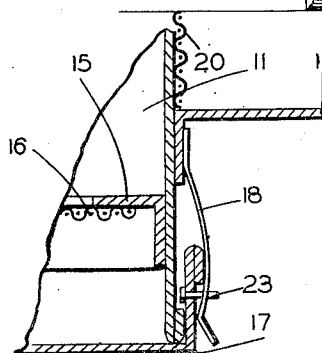
Figure 3 is a fragmentary detailed sectional view taken through the lower portion of the basket.

In the drawings, 10 generally indicates the cage or container, the lower part of which is comprised in a receptacle 11, made of a sheet material, preferably sheet metal, and with a removable bottom or floor 17. A tray is positioned about the upper end portion of the receptacle 11, with the inner edges of its bottom walls turned downwardly to form flanges which are soldered, or otherwise secured, to the side walls of the receptacle; the outer side walls of the tray 12 having their top edges disposed in the plane of the top edges of the latter. The corners of the side walls of the tray are preferably rounded, as shown in Figure 1, and an arched handle 14 is pivoted centrally of opposite sides of the tray.

Some distance below the plane of the tray bottom, a false floor 16 also is secured in place, within the receptacle by solder or other suitable means. This false floor consists of a frame 15, made of a light gauge angle metal, with a wire mesh 16 soldered, or otherwise secured, thereto.

The lower, open end of the receptacle 11 is closed by a removable bottom or closure, 17, which fits closely outside the drum and is held firmly in position by a pair of spring clips 18 fastened on each side of the drum 11 and adapted to snap over studs 23 on the bottom or closure 17.

The basket is completed by a casing 19 with four flat side walls 20 with straight top and bottom edges and made to fit snugly but removably outside the upper end of the receptacle 11.

This casing 19 is made entirely of wire mesh similar to the floor member 16 and the lid 21. Other parts of the basket may be made of metal, wood, plastic or cardboard. A removable lid consists of a square frame 21 on which is stretched a wire screen 22. The frame fits snugly over the casing 19. In some or each of the corners of the drum 11 may be provided a cup 25 for water and feed if desired.

It will be seen that by supplying the cage portion of the basket with top, side walls and floor of screen wire, the basket is very completely ventilated. Furthermore, since the cage, lid, upper side walls and bottom closure are detachable, the basket can easily be cleaned when necessary.

One use of this invention would be as an Easter basket containing an Easter bunny or rabbit, surrounded by fruit, candy, flowers and other seasonal decorations or vegetables, filling the surrounding tray.

It is to be understood that the invention as herein disclosed may be varied from the details described and shown without departure from the spirit of the subjoined claims.

I claim:

1. In a carrier of the class described, an open ended receptacle, a bottom removably supported on the lower end of said receptacle, a reticulated floor within said receptacle in spaced relation with respect to said bottom, a tray supported from and extending about the upper end of said receptacle and having the top edges of its outer wall disposed in the plane of the like edges of the receptacle, an open ended extension engaged over the upper end of said receptacle and having reticulated side walls, a reticulated cover removably seated upon the upper end of said extension, and an arched handle having its ends pivotally attached to opposite side of said tray.

2. The carrier as defined in claim 1, wherein the said floor within said receptacle and the said cover for said extension of the receptacle each is comprised in a frame formed of angle metal and a covering of a wire mesh, and said extension is formed of a similar wire mesh.

3. The carrier as defined in claim 1, wherein the said bottom of said receptacle is removably secured in place by means comprised in a pair of studs projecting from opposite sides of the bottom, and a clip of flat spring metal is secured on the receptacle to engage with the complemental of said studs.

FRED WETZEL, Sr.

REFERENCES CITED

The following references are of record in the file of this patent:

UNITED STATES PATENTS

| Number | Name | Date |
|---|---|---|
| 1,045,135 | Farmer | Nov. 26, 1912 |
| 1,498,197 | Pelegren | June 17, 1924 |
| 1,704,980 | Larrabee | Mar. 12, 1929 |